W. CONCANNON & W. F. DRAGO.
Combined Roller and Harrow.

No. 197,204.   Patented Nov. 20, 1877.

WITNESSES
A. G. Morey
Adolf Stelle

INVENTOR
Washington Concannon
William F. Drago.
By G. L. Chapin
Atty.

UNITED STATES PATENT OFFICE.

WASHINGTON CONCANNON AND WILLIAM F. DRAGO, OF VALPARAISO, INDIANA.

IMPROVEMENT IN COMBINED ROLLER AND HARROW.

Specification forming part of Letters Patent No. 197,204, dated November 20, 1877; application filed September 4, 1877.

*To all whom it may concern:*

Be it known that we, WASHINGTON CONCANNON and WILLIAM F. DRAGO, of Valparaiso, in the county of Porter and State of Indiana, have invented a new and useful Improvement in Combined Roller and Pulverizer, of which the following is a specification, reference being had to the accompanying drawings illustrating the improvement, in which—

Figure 1:
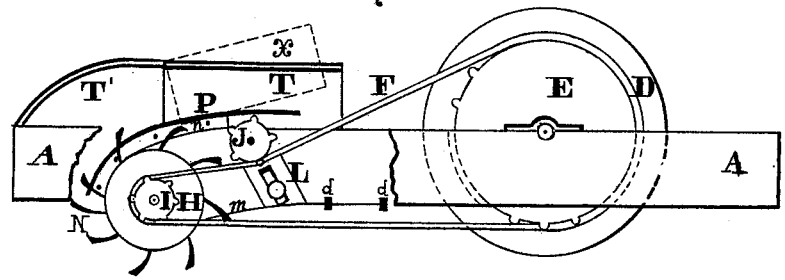
Figure 2:
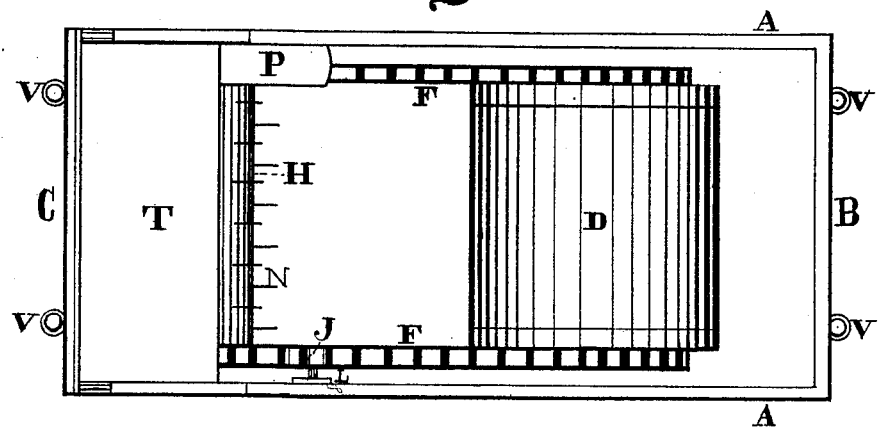
Figure 3:

Figure 1 is a side elevation with a portion of the side frame broken away to show the interior mechanism; Fig. 2, a plan or top view thereof, with the folding portion of the housing turned back on the stationary part, and one of the chain-housings removed, also to show the interior parts. Fig. 3 is an enlarged view of the link-cleaner and a broken section of the endless chain-belt, showing the relative position of the parts.

This invention relates to an improvement for leveling and pulverizing the soil by a single passage of the implement over a given portion of ground; and its nature consists, in brief, in the employment of an ordinary land-roller, which, by means of chain-gear, communicates a desired rotary motion to a toothed pulverizer, in combination with suitable appliances to free the links of the chains from accumulated soil, and prevent soil from coming in contact with the chain, and prevent the gear from being clogged, so as to be inoperative, as the whole is hereinafter fully described and illustrated.

A B C represent a suitable frame for supporting the devices, as follows: A suitable roller, D, of the desired weight, is, by means of an ordinary shaft, hung so as to roll over the ground when the frame is moved in either direction longitudinally. H represents a cylinder, which is also hung to said frame so as to rotate, and is provided with a suitable number of teeth, N, for piercing the soil and pulverizing it. Both ends of the drum D and cylinder H are provided with toothed wheels, as shown at E I, for carrying chain-gear F F, which, by the rotation of the drum D as it travels over the soil, imparts motion to the cylinder H.

To tighten the chain-gear F F, and at the same time and by this means free the chain-links from soil, we employ toothed wheels J, which are hung to rotate on arms projecting out from adjustable supporting-plates L, which are provided with longitudinal slots, through which set-screws are put to hold the plates to the frame-pieces A after such an adjustment is made of the rollers J as to bring the chains into proper tension. The wheels thus arranged, also, by means of their teeth passing into the links of the chain, push out the accumulated soil, and thus prevent the wear of the wheel E and the chains to a great extent, and prevents the clogging of the parts and stopping their rotation.

To clean the links of chains before their passage under the gear I I, we employ what we term "link-cleaners" *m*, which are made of some spring material, fastened to the frame A at *d d*, and provided with curved points *p*, Fig. 3, so that the upwardly-turned points will carry earth back and throw it from the chains, and the lower part of the curve will, as the chain moves forward, pass into the links and push out any earth therein immediately forward of the gears I, and thus leave the chain free to connect with the gear it is to rotate.

To prevent the pulverizer H N from throwing earth on the chains F, curved housing P, with suitable flanges *n*, for attaching them to the frame-pieces A, are placed over the gears I I, and extend forward to cover the wheels J; and to prevent the dust and earth from being raised, to the annoyance of the operator, a housing, T T', is placed on one end of the frame A C, the part T being hinged to T', that it may be raised up to adjust the gear beneath and in cleaning the pulverizer.

In the present proportions of the drum D and cylinder H, the latter will have about five revolutions to the drum's one; but the cylinder may have a greater or less number of revolutions.

The gearing and chains should be of iron;

but the other parts may be made mostly of wood, as is now done in the construction of farm implements.

V shows the draft attachments.

We claim and desire to secure by Letters Patent—

1. The combination of the spring curved pointed link-cleaner $m$ with the gear I I and chains F, as described and shown.

2. The two-part housing T T', housing P, wheel J, cleaner $m$, roller D, pulverizer H I, and chain F, combined as and for the purpose set forth.

WASHINGTON CONCANNON.
WILLIAM F. DRAGO.

Witnesses:
I. N. SKINNER,
D. C. HERR.